UNITED STATES PATENT OFFICE.

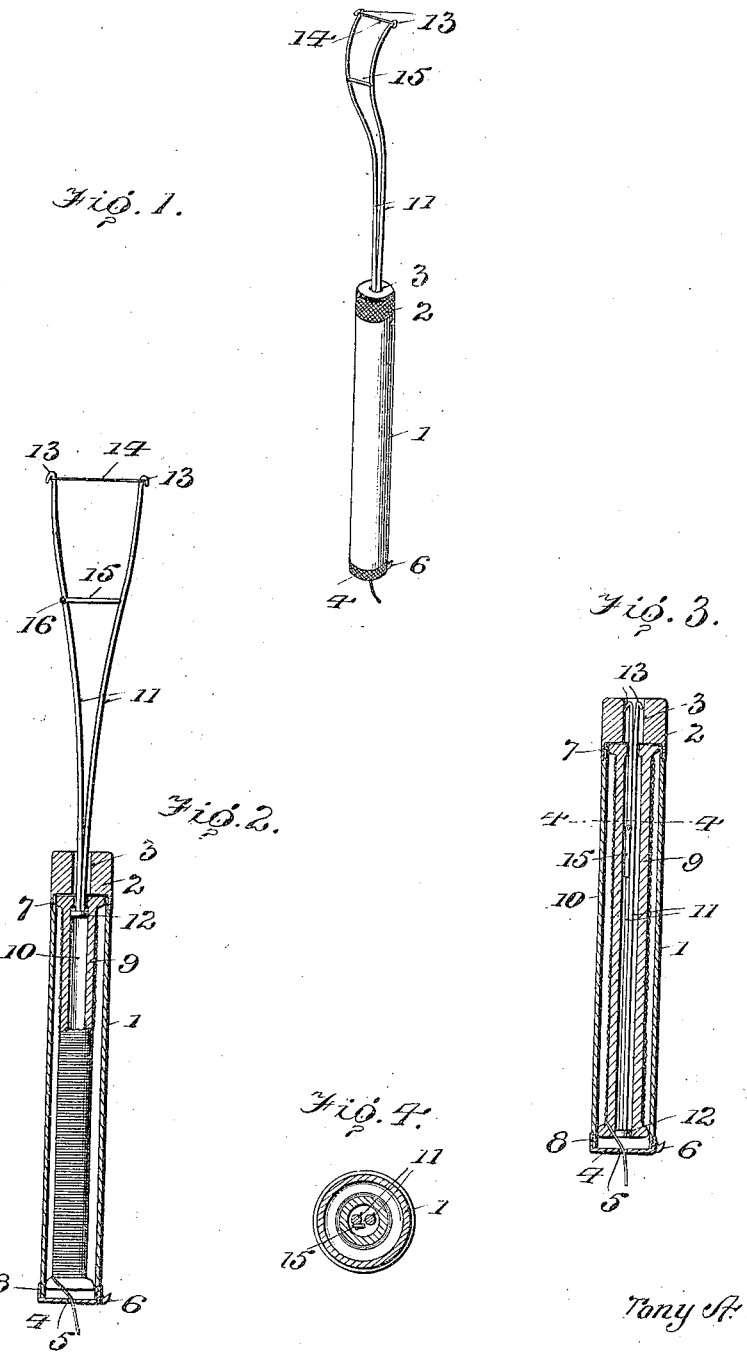

TONY A. TUBBS, OF TREADWELL, DISTRICT OF ALASKA.

DENTAL FLOSS-HOLDER.

No. 922,824.　　　Specification of Letters Patent.　　　Patented May 25, 1909.

Application filed January 6, 1909. Serial No. 470,904.

*To all whom it may concern:*

Be it known that I, TONY A. TUBBS, a citizen of the United States, residing at Treadwell, Alaska, have invented certain new and useful Improvements in Dental Floss-Holders, of which the following is a specification.

My invention relates to certain new and useful improvements in dental floss holders, and it has for its object to provide a new and useful dental appliance for cleaning the spaces between the teeth by means of a filament of dental floss or the like.

Another object of my invention is to provide a device of this character which will be simple in construction, cheap to manufacture and composed of few parts, and one which may be readily carried in the pocket when not in use.

With these and other objects in view my invention consists in certain constructions, combinations and arrangements of parts, the preferred form of which will be first described in connection with the accompanying drawing, and then the invention particularly pointed out in the appended claims.

Referring to the drawings wherein the same part is designated by the same reference numeral wherever it occurs, Figure 1 is a perspective view of my appliance in condition for use; Fig. 2 is a central longitudinal section of the handle portion, the floss holding arms being however shown in elevation; Fig. 3 is a central longitudinal section of the device when closed and in condition to be carried in the pocket, and Fig. 4 is a cross section taken on line 4, 4 of Fig. 3.

1 designates a hollow tube forming the body portion of the handle of my device, closed at one end by a cap 2, centrally perforated at 3. The other end of the tube is closed by a cap 4 centrally perforated at 5. The cap 4 also preferably carries a cutter 6 of hook form. Preferably, the caps 2 and 4 have threaded flanges 7, 8, which screw on to threaded ends of the tube. Located within the tube is a spool 9 adapted to have wound thereon a supply of dental floss, the end of the floss projecting through the opening 5 in the cap 4, as the spool is rotatably mounted in the tube the floss may be readily unwound from the spool as needed for use.

The spool is hollow as shown at 10, and 11, are a pair of spring arms united at their lower ends by a head 12 which is adapted to slide in the bore 10 of the spool, with the arms projecting out through one end of the spool and through the opening 3 in the cap 2. These spring arms at their upper end are provided with hooks 13, into which a length of dental floss 14 may be caught in the ordinary manner.

15 is an arm pivoted at 16 to one of the spring arms 11, and adapted to press against the side of the other arm 11, so as to hold them apart when the device is ready for use, as shown in Figs. 1 and 2, and hold the length of the dental floss 14 taut.

When it is desired to place the device in the pocket after use the arm 15 is moved on its pivot until it is parallel with the arm 11 to which it is attached, which permits the spring arms 11 to spring together and to be readily passed down into the handle until they assume the position shown in Fig. 3.

I realize that considerable variation is possible in the details of construction and arrangement of parts without departing from the spirit of my invention, and I therefore do not intend to limit myself to the specific form shown and described except as required by the scope of the appended claims.

What I claim as new and desire to secure by Letters Patent is—

1. A dental floss holder comprising a hollow tube closed at its ends by caps having central perforations, a floss carrying spool rotatably mounted in the tube between the caps and provided with a central bore, and a pair of spring arms provided with floss engaging hooks at their outer ends and having their inner ends extending through a perforation in one of the caps and into the bore of the spool, whereby the arms may be moved into the bore of the spool when not in use.

2. A dental floss holder comprising a hollow tube closed at its ends by caps having central perforations, a floss carrying spool rotatably mounted in the tube between the caps and provided with a central bore, a pair of spring arms provided with floss engaging hooks at their outer ends and having their inner ends extending through a perforation in one of the caps and into the bore of the spool, whereby the arms may be moved into the bore of the spool when not in use, and a brace pivoted to one of the arms and adapted to engage the other arm to hold the spring arms apart after the arms have been withdrawn from the spool.

In testimony whereof I affix my signature in presence of two witnesses.

TONY A. TUBBS.

Witnesses:
 CHESTER G. McKINNON,
 F. P. HENSON.